(12) United States Patent
Scheidegger et al.

(10) Patent No.: US 6,622,586 B2
(45) Date of Patent: Sep. 23, 2003

(54) POSITIONING DEVICE

(75) Inventors: Andreas Scheidegger, Konolfingen (CH); Ralph Liechti, Langnau (CH)

(73) Assignee: Liechti Engineering AG, Langnau (CH)

( * ) Notice: Subject to any disclaimer, the term of this patent is extended or adjusted under 35 U.S.C. 154(b) by 0 days.

(21) Appl. No.: 10/029,078

(22) Filed: Dec. 21, 2001

(65) Prior Publication Data

US 2002/0078779 A1 Jun. 27, 2002

(30) Foreign Application Priority Data

Dec. 21, 2000 (EP) .............................................. 00811228

(51) Int. Cl.$^7$ ................................................. B23Q 1/48
(52) U.S. Cl. ................................. 74/490.08; 74/490.07
(58) Field of Search ........................... 74/490.08, 490.1, 74/490.09, 479.01, 490.06, 490.07; 409/201, 235, 211; 318/649, 135, 640, 560, 687; 248/651, 653, 183.2, 913; 269/71, 73, 285; 901/28, 29; 384/7, 17; 108/139, 140, 143, 22, 20; 33/1 M, 568; 359/393, 872; 408/131; 414/735; 700/60; 310/12; 355/53; 356/500

(56) References Cited

U.S. PATENT DOCUMENTS

| | | | |
|---|---|---|---|
| 3,232,141 A | | 2/1966 | Swanson et al. |
| 4,006,645 A | * | 2/1977 | Newell |
| 4,610,442 A | * | 9/1986 | Oku et al. |
| 4,742,286 A | * | 5/1988 | Phillips |
| 5,036,723 A | * | 8/1991 | Matsumoto |
| 5,323,712 A | * | 6/1994 | Kikuiri |
| 5,523,941 A | * | 6/1996 | Burton et al. |
| 5,836,080 A | * | 11/1998 | Inagaki et al. |
| 5,982,132 A | * | 11/1999 | Colby |
| 6,196,138 B1 | * | 3/2001 | Sakai et al. |
| 2002/0003413 A1 | * | 1/2002 | Chiba |

FOREIGN PATENT DOCUMENTS

| | | |
|---|---|---|
| DE | 195 40 303 C1 | 3/1997 |
| EP | 0666132 A1 * | 8/1995 |
| EP | 1216787 A1 * | 12/2000 |
| FR | 2 770 432 A1 | 5/1999 |
| JP | 8-99243 A | 4/1996 |
| WO | WO 99/38646 A1 | 8/1999 |

OTHER PUBLICATIONS

Kraus, W. et al., "Positionieren im Ein–Ebenen–Prinzip", *Feinwerktechnik & Messtechnik,* Aug., 1991, pp. 306–307, Carl Hansen Verlag, Munchen.

* cited by examiner

*Primary Examiner*—Douglas C. Butler
(74) *Attorney, Agent, or Firm*—Dorsey & Whitney LLP

(57) ABSTRACT

Conventional positioning devices in which a body is displaceable in a plane and rotatable by three drives have the drawback that at least one of the drives is displaced together with the body, whereby these apparatus are relatively heavy and sluggish. In the case of the positioning device according to the invention, three straight guide elements, arranged radially, are rigidly connected to the body. Each guide element is accepted in a linear bearing in a longitudinally displaceable way, and each linear bearing is disposed on a separate rotor in a way pivotable about a pivot axis directed perpendicular to the plane. Through independent displacement of the linear bearings on a common circular path, the body can be shifted and rotated as desired in a region. This construction has the advantage that it is built simply and that it is able to execute quick and precise positioning movements in particular owing to small masses in motion.

11 Claims, 9 Drawing Sheets

US 6,622,586 B2

1

POSITIONING DEVICE

This invention relates to a positioning device in which a body is displaceable and rotatable in a plane by means of three drives.

Various positioning devices are known in which a body is displaceable and rotatable in a plane by means of three drives. These known devices have the drawback that at least one of the drives is displaced together with the body, whereby these devices are relatively heavy and sluggish.

The invention has as its object to propose a positioning device which is simply constructed and in which the masses in motion are as small as possible.

This object is achieved according to the invention in that three elongated, non-parallel guide elements are rigidly connected to the body, each guide element is received in a longitudinally displaceable way in a translational bearing, each translational bearing is pivotable about a pivot axis directed perpendicular to the plane, each pivot axis is disposed on a rotor spaced apart from its rotational axis and parallel to this rotational axis, and the three rotors are disposed axis-parallel and are rotatable by means of the drives.

This construction has the advantage that it is built simply and that in particular none of the drives has to be moved along by another drive.

According to a preferred embodiment of the invention, the three rotors are disposed coaxially, whereby the positioning device can be particularly simply constructed.

If, according to a further special embodiment of the invention, the spacing of the rotor axis to the pivot axis is the same for all three rotors, all three pivot axes move on the same circular path, whereby the control of the positioning device can be designed much more simply.

The guide elements are preferably designed straight and are disposed on the body with a mutual angular spacing of 120 degrees. These measures, too, simplify control of the positioning device.

If, according to a further preferred embodiment of the invention, the drives are motors, each motor being connected to one of the rotors via a gearing, motors commonly available on the market can be used to achieve the positioning device.

According to an especially preferred embodiment of the invention, the drives are electro-motors, which have a common stator, and there are elements on each of the rotors that cooperate electromagnetically with corresponding elements disposed on the stator. Parts can be saved in this way, resulting in an especially light and fast-reacting positioning device.

Figure 1:
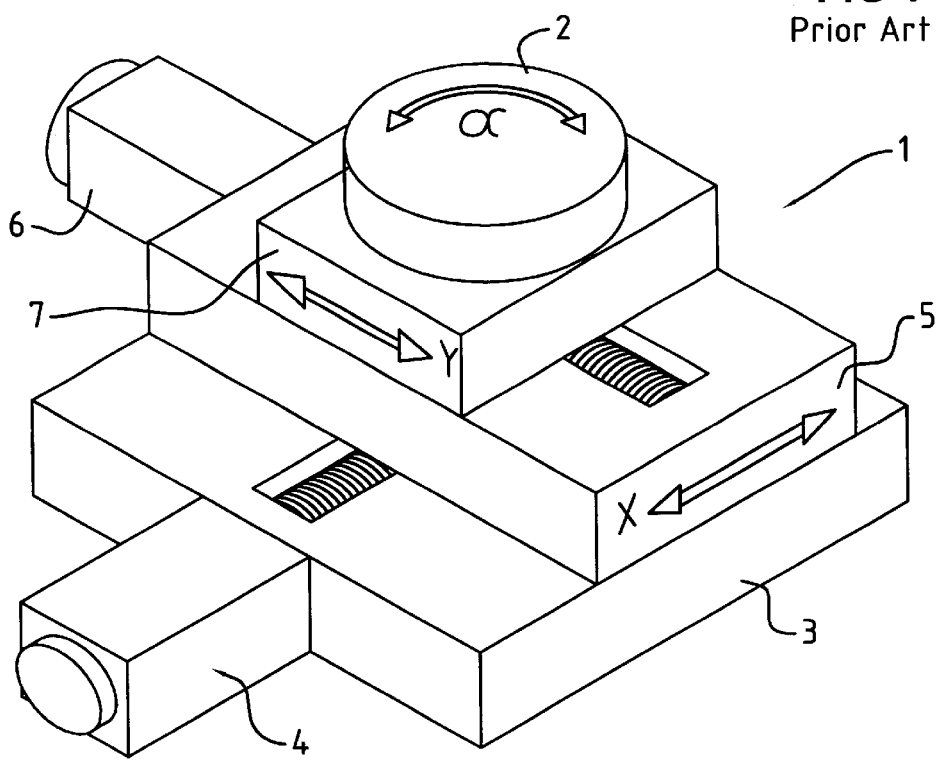
Figure 2:
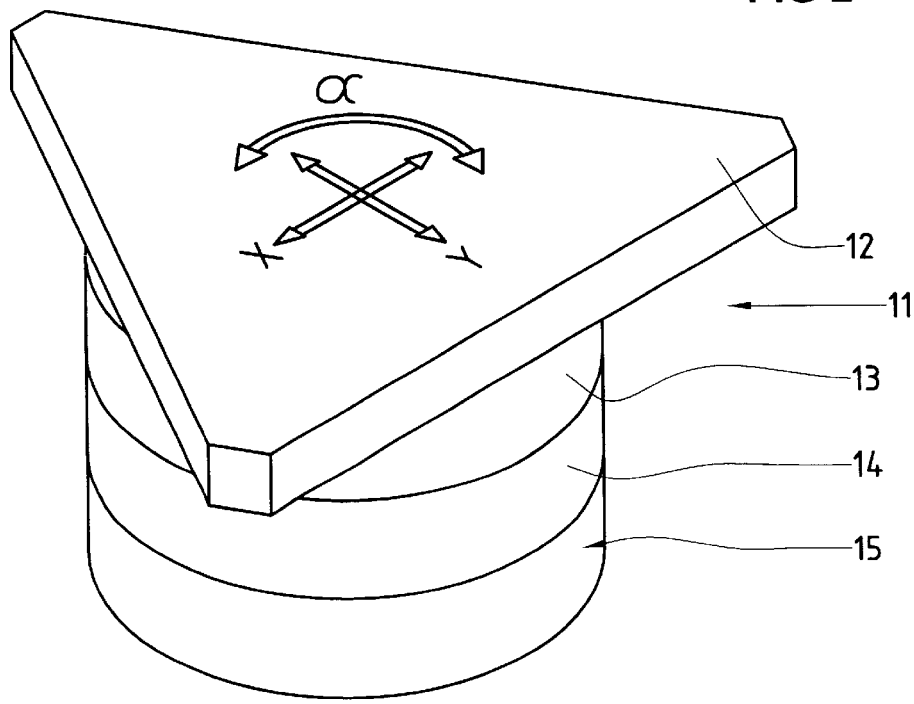
Figure 3:
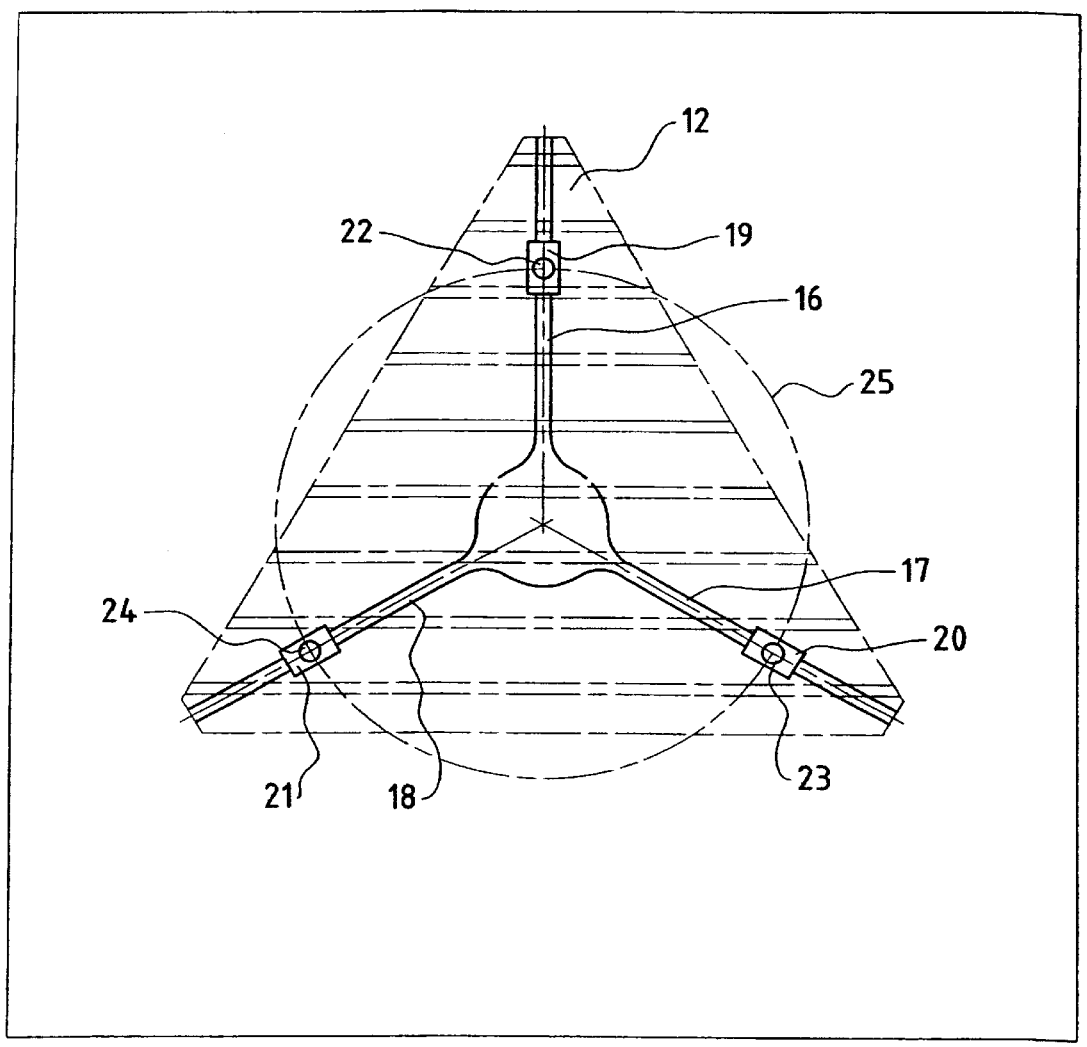
Figure 4:
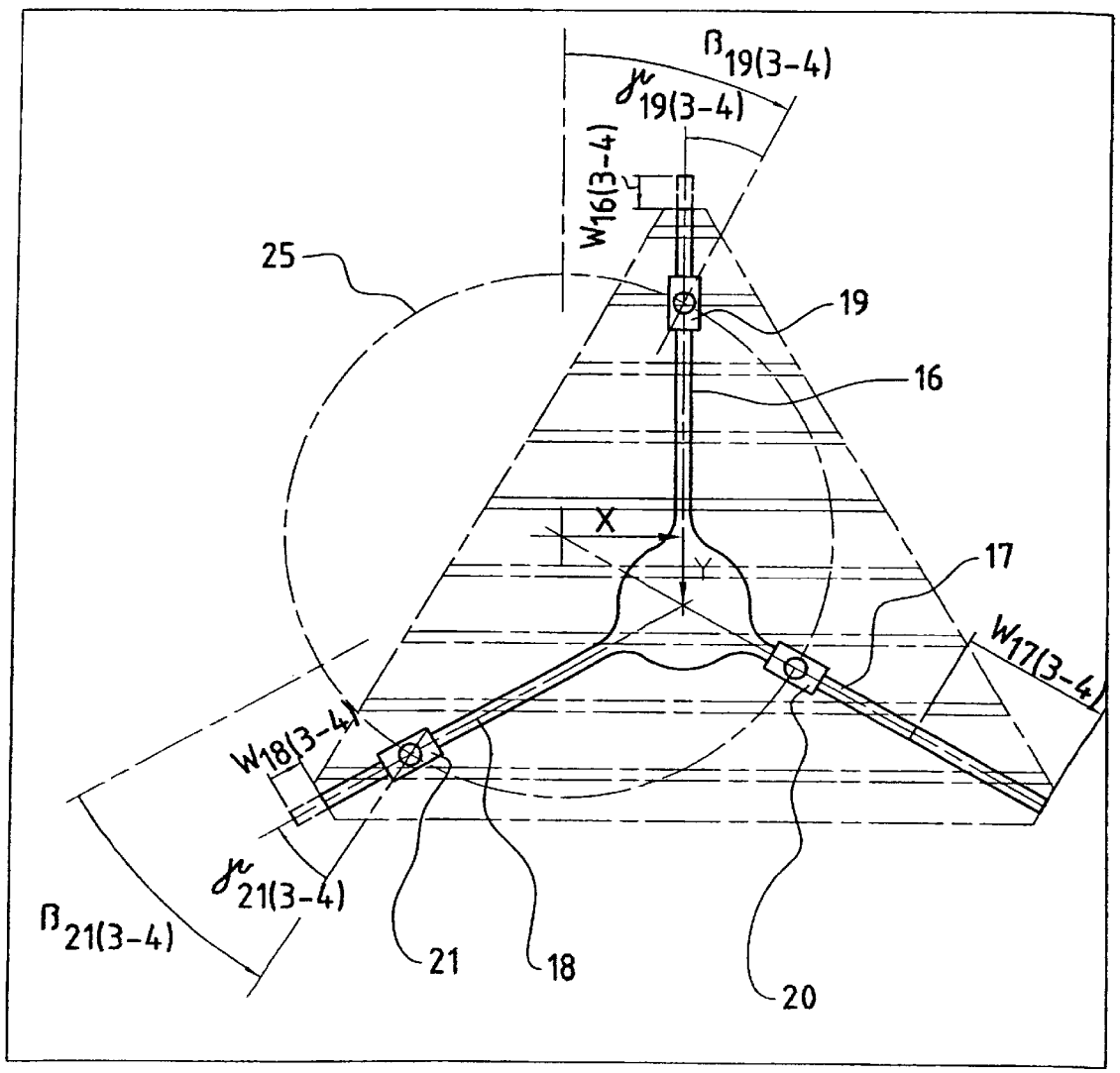
Figure 5:
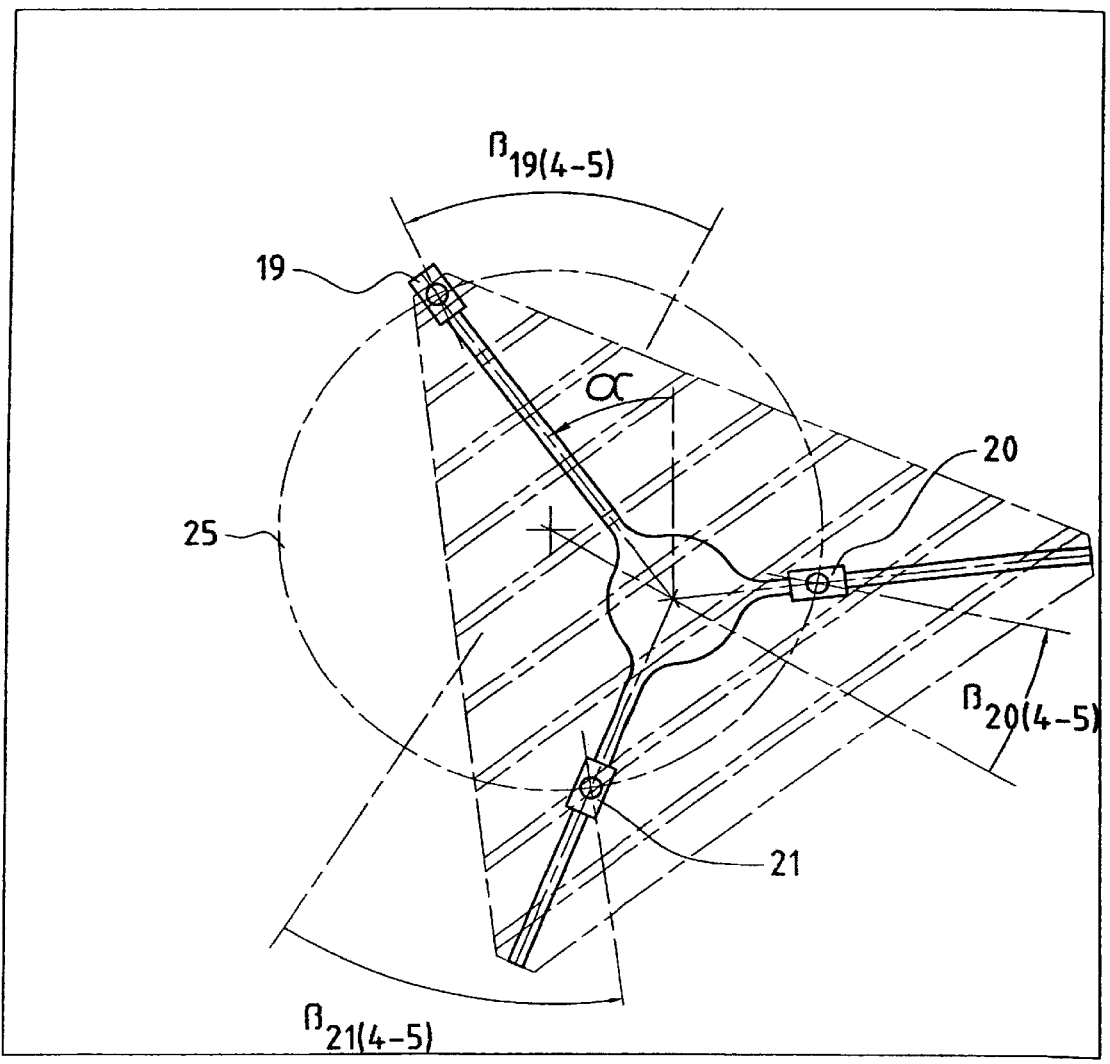
Figure 6:
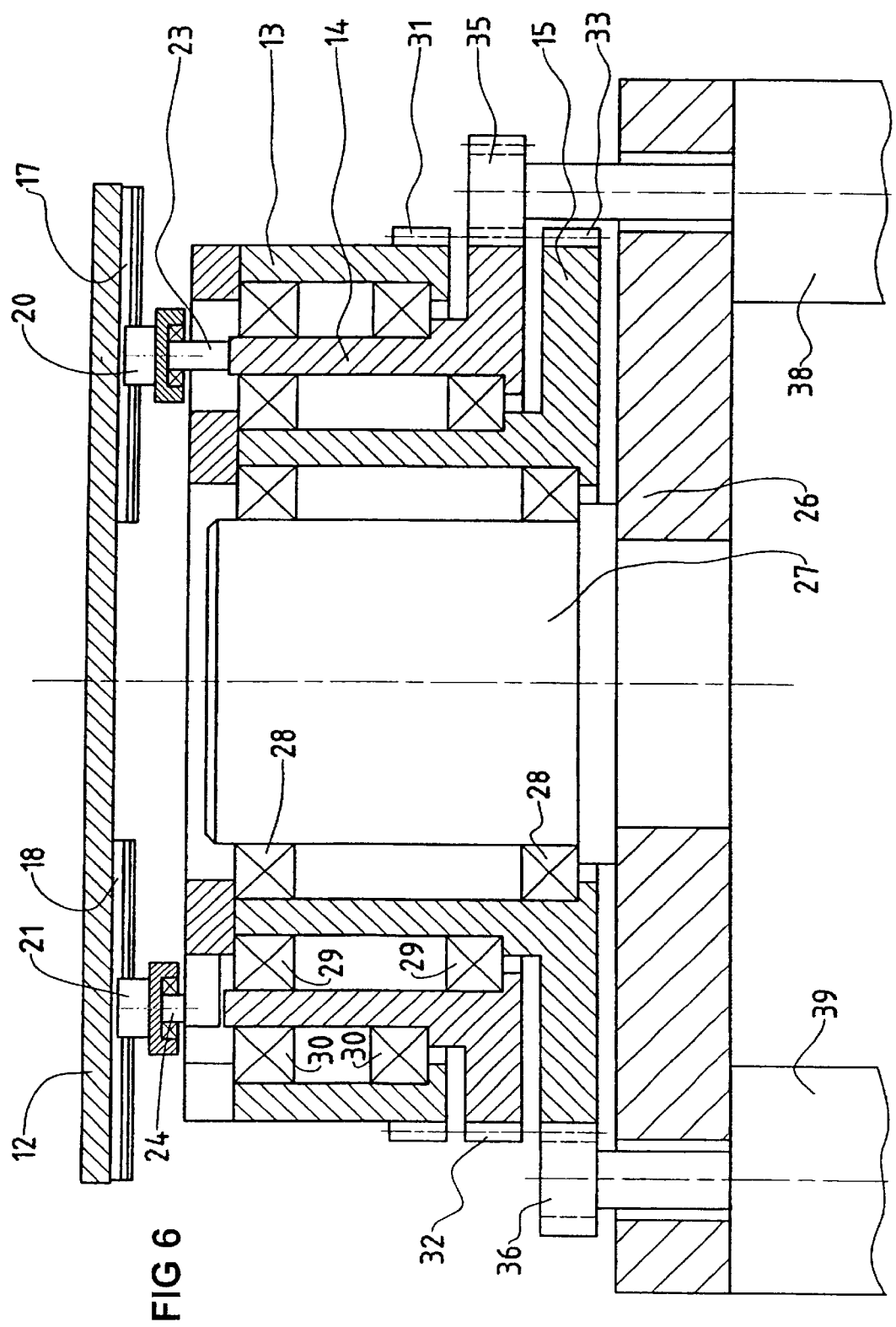
Figure 7:
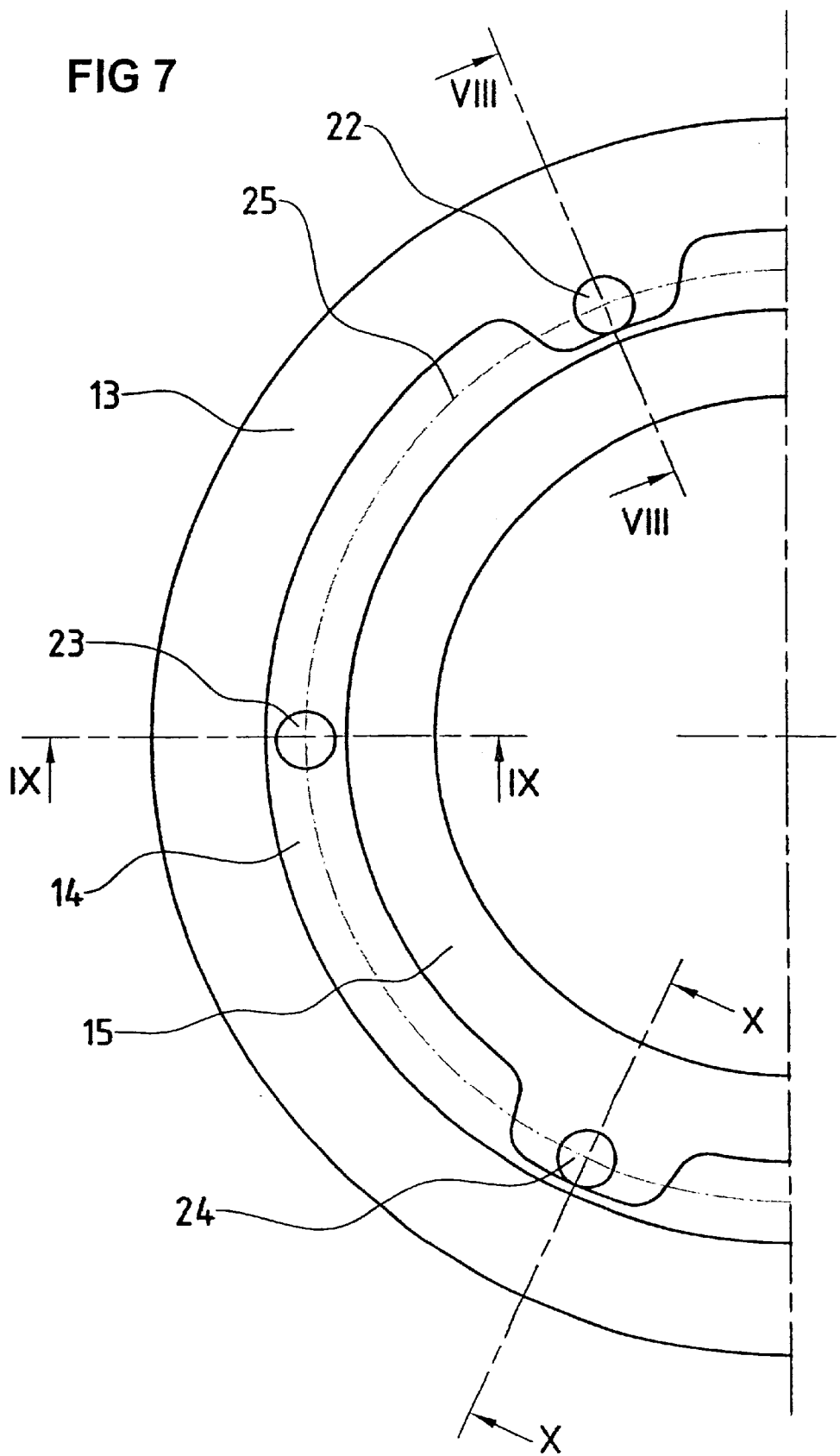
Figure 8:
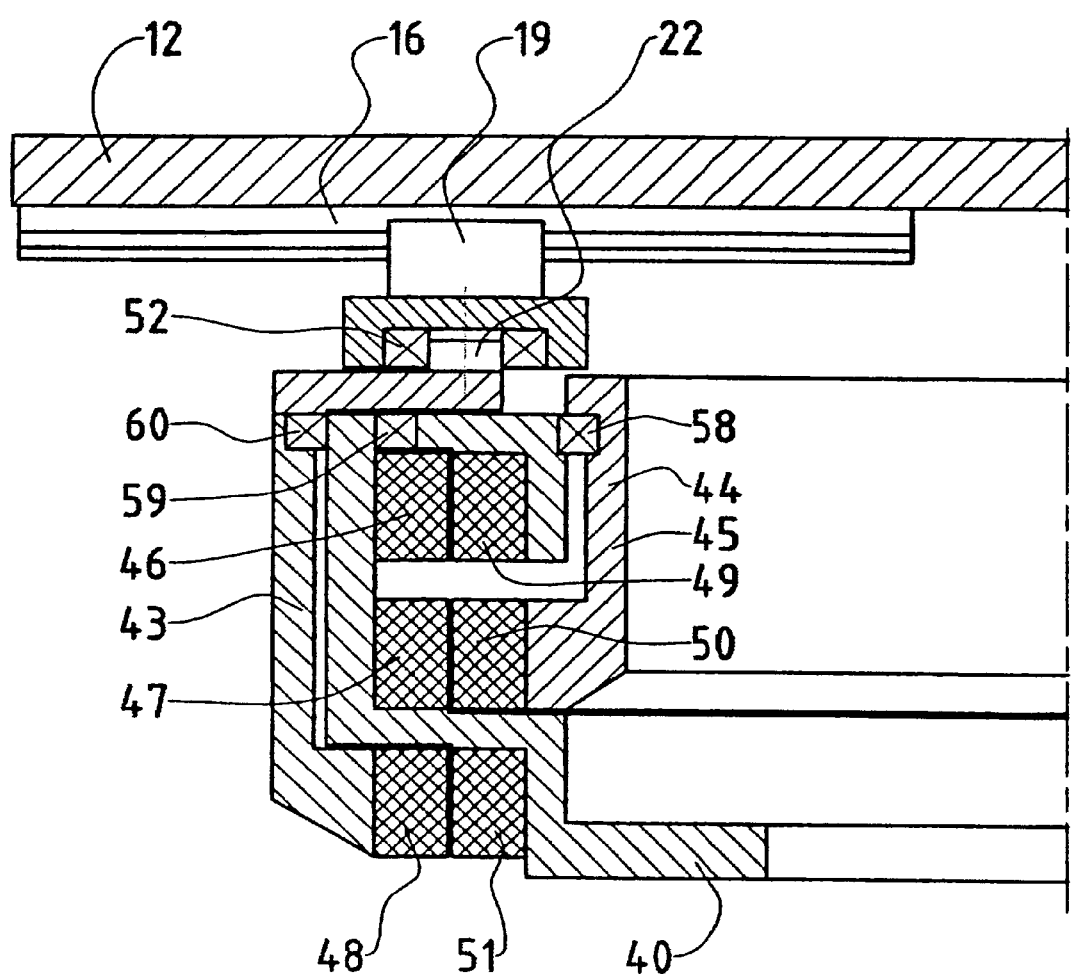
Figure 9:
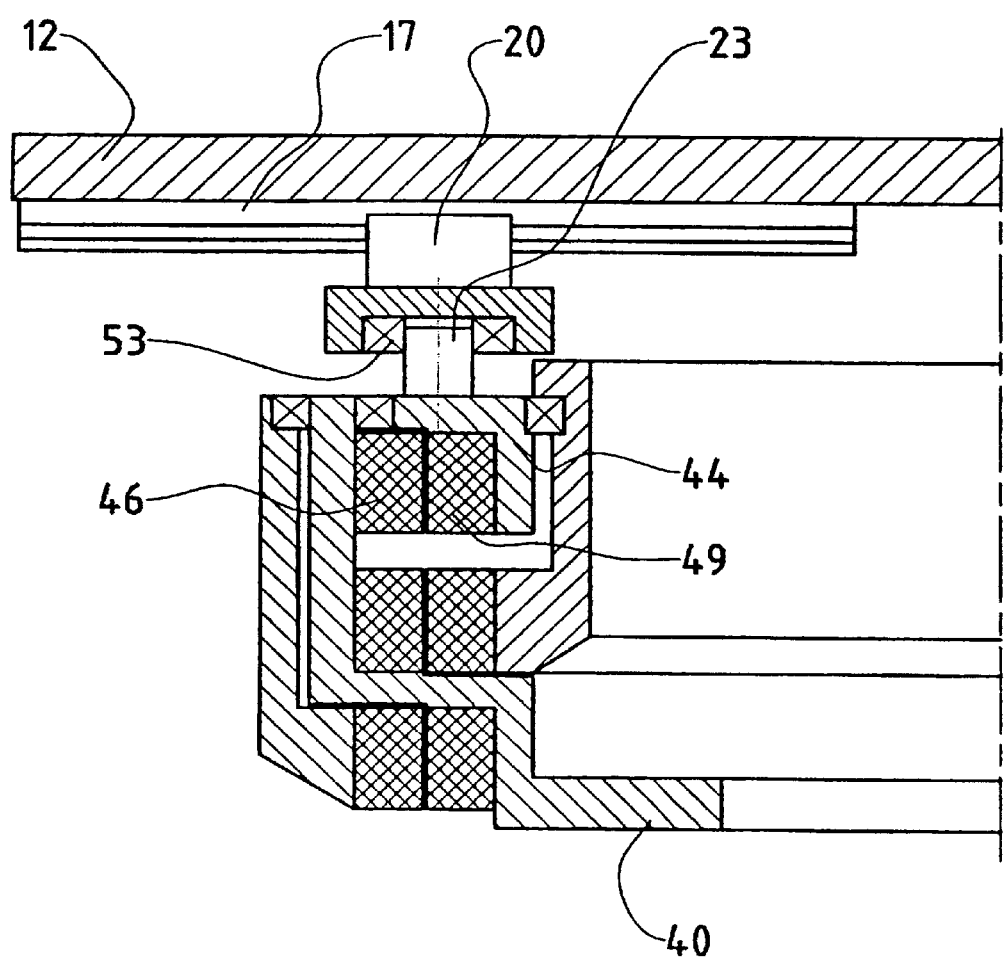
Figure 10:
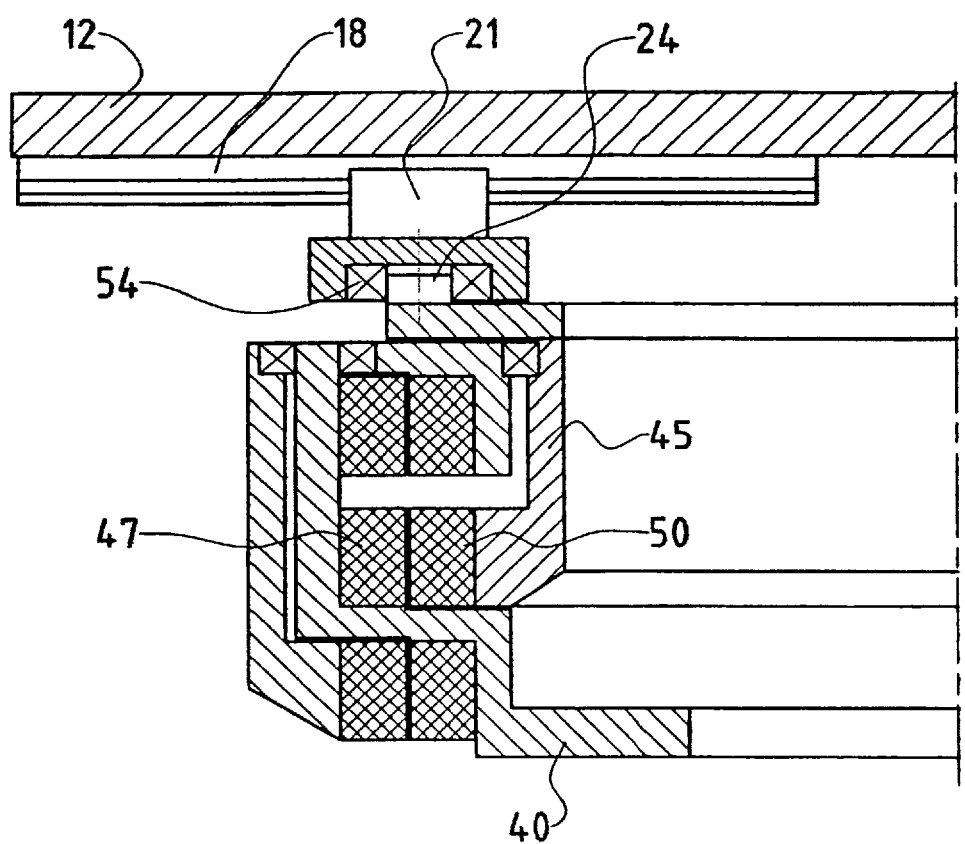

A conventional positioning device and a special embodiment example of the positioning device according to the invention will be explained more closely in the following, by way of example, with reference to the attached drawings:

FIG. 1 is a schematic illustration in perspective of a positioning device according to the state of the art, FIG. 2 is a schematic illustration in perspective of an embodiment example of the invention, FIGS. 3, 4 and 5 show a schematic plan of the positioning device according to FIG. 2 in three different positions, FIG. 6 is a longitudinal section through an embodiment example of the positioning device according to the invention, FIG. 7 is a horizontal projection of the positioning device, the body and the linear bearing being received, and FIGS. 8, 9 and 10 are longitudinal sections along the lines VIII—VIII, IX—IX, and X—X, marked in FIG. 7,

2 through a further embodiment example of the positioning device according to the invention.

In the case of the conventional positioning device 1, shown schematically in FIG. 1, a body 2 is disposed displaceable and rotatable in a plane. The body 2 can be, for instance, a table serving to receive a workpiece to be machined, or a chucking device for a tool. Disposed on a base 3 is a first drive 4, by means of which a slide 5 is displaceable on the base 3 in a first direction X. Disposed on the slide 5 is a second drive 6, by means of which a second slide 7, guided on the first slide 5, is movable in a direction Y running at a right angle to the first direction X. The second slide 7 bears a rotary drive (not shown) with which the body 2 is rotatable about its axis, oriented perpendicular to the plane X-Y, in the direction of the double arrow α. Thus if the body 2 is supposed to be shifted in the Y direction, the drive 6 with the body 2 also has to move its rotary drive and the slide 7. If the body 2 is supposed to be shifted in the X direction, the drive 4 with the body 2 also has to move its rotary drive, the slide 7 and the slide 5. All these masses to be moved represent a huge impediment, particularly for quick movements of the body 2, and the drives 6 and 4 have to be powerfully dimensioned.

FIG. 2 shows, in an extremely simplified perspective view, an embodiment of the positioning device according to the invention, which is designated here as a whole by 11. The body 12 to be positioned, which can be designed as a table, for example, and which can have a chucking device (not shown) for a workpiece or a tool, is represented here as a triangle with broken corners. It could of course have any other shape, however. Three rotors 13, 14 and 15, whose function will be explained further below, are disposed coaxially under the body 2.

The functioning of the positioning device according to the invention will now be explained with reference to FIGS. 3 to 5. In these figures, the body 12 is indicated only by broken lines. Three guides 16, 17 and 18 are arranged radially under the body 12, and are firmly connected to the body 12. Each of the guides 16, 17 and 18 is received in a linear bearing 19, 20 and 21, which are borne, for their part, by one of the rotors 13, 14 and 15 in each case, via one hinge bearing each. Each of the hinge bearings has a shaft 22, 23, and 24 directed perpendicular to the plane X-Y, which is borne by one of the rotors 13, 14 and 15 and is independently movable on a common circular path 25. FIG. 3 shows a position of the body 12 in which the three linear bearings each have the same angular spacing of 120° on the circular path 25 with respect to one another. In this position, the body 12 is located in the center of the surface area in which it can be displaced.

FIG. 4 shows a position of the body 12 in which this body has been shifted parallel to the position shown in FIG. 3. This has been achieved in that the linear bearing 19 on the circular path 25 has been shifted clockwise by an angle $\beta_{19(3-4)}$ and the linear bearing 21 counter-clockwise by an angle $\beta_{21(3-4)}$, while the linear bearing 20 has kept its place according to FIG. 3. The guides 16, 17 and 18 have thereby shifted themselves relative to the linear bearings, as is shown by the arrows $w_{16(3-4)}$, $w_{17(3-4)}$ and $w_{18(3-4)}$, and the linear bearings 19 and 21 have turned about their axes by the angles $\gamma_{19(3-4)}$ and $\gamma_{21(3-4)}$. As a result, the body 12 has shifted in the plane of the drawing to the right by the amount X and downward by the amount Y.

FIG. 5 shows a position of the body 12 in which this body has been turned by an angle α with respect to the position shown in FIG. 4, while its center has remained at exactly the same place as in FIG. 4. This has been achieved in that, starting from the position according to FIG. 4, all three linear bearings have been shifted counter-clockwise on the circular path 25 by differing angular amounts, namely $\beta_{19(4-5)}$, $\beta_{20(4-5)}$ and $\beta_{21(4-5)}$.

FIG. 6 shows a longitudinal section through an embodiment example of the positioning device. Disposed on a base plate 26 is a central shaft 27 which bears the three rotors 13, 14 and 15 in a concentric configuration. First bearings 28 rotatably support the rotor 15 on the shaft 27. Second bearings 29 rotatably support the rotor 14 on the rotor 15, and third bearings 30 rotatably support the rotor 13 on the rotor 14, so that each rotor is independently rotatable. Toothed rings 31, 32 und 33 are provided below on each rotor, a pinion meshing with each of these toothed rings, of which only two, i.e. the pinions 35 and 36, are visible in the sectional view according to FIG. 6, however. Each pinion is connected to an independent motor 38, 39. Disposed on the upper side of each rotor is one of the three pivot axes 22, 23 and 24 for the linear bearings. Visible in FIG. 6 are only the pivot axes 23 and 24. Likewise, only the corresponding guides 17 and 18, fixed to the table 12, are visible in the sectional view of FIG. 6. FIG. 7 shows in a horizontal projection how the pivot axes 22, 23 and 24 are connected to the rotors 13, 14 and 15.

Shown in FIGS. 8 to 10 is another embodiment of the positioning device according to the invention, each figure showing in each case half of the device in a longitudinal section. FIG. 8 shows a section along the line VIII—VIII of FIG. 7. FIG. 9 shows a section along the line IX—IX of FIG. 7, and FIG. 10 shows a section along the line X—X of FIG. 7. In this embodiment a stator 40 is provided on which the rotors 43, 44 und 45 with bearings 58, 59 and 60 are rotatably supported. In this embodiment, the motors for the drive of the three rotors are integrated in that the stator 40 bears three stator windings 46, 47 and 51 which cooperate with rotor windings 49, 50 and 48 that are provided on the rotors 43, 44 and 45. Permanent magnets can also be provided instead of stator windings, or preferably instead of rotor windings. Each of these three motors integrated into the device can thereby be constructed, for example, so as to be able to be operated like a stepping motor. With a corresponding control, these motors can be driven in such a way that the body 12 is able to be positioned very precisely. Since each rotor is movable independently of the other rotors, the masses to be accelerated in operation are minimal compared with state-of-the-art positioning devices, and the movements of the positioning device can therefore be carried out very quickly and exactly.

What is claimed is:

1. A positioning device in which a body is displaceable and rotatable by means of three drives in a plane, wherein three elongated, non-parallel guide elements are rigidly connected to the body, each guide element is received in a translational bearing in a longitudinally displaceable way, each translational bearing is pivotable about a pivot axis directed perpendicular to the plane, each pivot axis is disposed on a rotor spaced apart from its rotational axis and parallel to this rotational axis, and the three rotors are disposed axis-parallel and are rotatable by means of the drives.

2. The positioning device according to claim 1, wherein the three rotors are disposed coaxially.

3. The positioning device according to claim 2, wherein the spacing of the rotor axis to the pivot axis is the same for all three rotors.

4. The positioning device according to claim 1, wherein the guide elements are straight.

5. The positioning device according to claim 2, wherein the guide elements are straight.

6. The positioning device according to claim 3, wherein the guide elements are straight.

7. The positioning device according to claim 4, wherein the angle between the guide elements is in each case 120 degrees.

8. The positioning device according to claim 5, wherein the angle between the guide elements is in each case 120 degrees.

9. The positioning device according to claim 6, wherein the angle between the guide elements is in each case 120 degrees.

10. The positioning device according to one of the claims 1 to 9, wherein the drives are motors, each motor being connected to one of the rotors via a gearing.

11. The positioning device according to one of the claims 1 to 9, wherein the drives are electro-motors which have a common stator, and there are elements on each of the rotors that cooperate electromagnetically with corresponding elements disposed on the stator.

* * * * *